United States Patent [19]

Williston et al.

[11] 4,045,544
[45] Aug. 30, 1977

[54] PROCESS FOR THE PREPARATION OF FERROMAGNETIC CHROMIUM DIOXIDE

[75] Inventors: David Wyckoff Williston, Newark; Lewis Clinton Bancroft; Dale Murray Hiller, both of Wilmington, all of Del.

[73] Assignee: E. I. Du Pont de Nemours and Company, Wilmington, Del.

[21] Appl. No.: 719,167

[22] Filed: Aug. 31, 1976

[51] Int. Cl.$^2$ ............................................. C01G 37/02
[52] U.S. Cl. .............................. 423/607; 252/62.51; 23/290; 23/290.5
[58] Field of Search ...................... 423/607; 252/62.51; 23/290, 290.5, 291, 292; 264/319, 327, 332; 165/155, 177

[56] References Cited

U.S. PATENT DOCUMENTS

| 2,956,955 | 10/1960 | Arthur | 252/62.51 |
| 3,278,263 | 10/1966 | Cox | 252/62.51 |
| 3,592,609 | 7/1971 | Honbo | 423/607 |
| 3,787,564 | 1/1974 | Kitamoto et al. | 423/607 |

*Primary Examiner*—Jack Cooper

[57] ABSTRACT

$CrO_2$ synthesized by the known hydrothermal reaction of $CrO_3/Cr_2O_3/H_2O$ mixtures (including minor dopants) by the use of a reaction vessel having a hollow longitudinal core open at both ends. The core may have a cross section of convenient size and shape. This process results in shortened heating and cool/vent/dry cycles resulting in increased overall productivity despite the apparent reduced volume of the reaction vessel.

8 Claims, 4 Drawing Figures

4,045,544

PROCESS FOR THE PREPARATION OF FERROMAGNETIC CHROMIUM DIOXIDE

BACKGROUND OF THE INVENTION

This invention relates to improvements in known processes for preparing ferromagnetic chromium dioxide that afford reduced process time requirements in commercial-scale operations.

Ferromagnetic materials have come into extensive use over the past few decades for magnetic recording tapes, discs and drums and the like as well as for memory devices, microwave circuitry, and magnetic cores. During this same period, many processes have been developed for the production of ferromagnetic chromium dioxide. In one such process, described in U.S. Pat. No. 2,956,955 issued Oct. 18, 1960 to Paul Arthur, Jr., a chromium (VI) oxide, $CrO_3$, is hydrothermally reduced to chromium (IV) oxide, $CrO_2$. In another process, described in U.S. Pat. No. 3,278,263 issued Oct. 11, 1966 to Norman L. Cox, compounds of chromium (III) combined with oxygen are oxidized to chromium (IV) oxide, $CrO_2$, by such oxidizing agents as $O_2$, $H_2O_2$ and $CrO_3$. For the Cox process, chromium (III) oxide, or a hydrated form thereof, is preferred because such materials are readily available and are easily converted to high-quality ferromagnetic chromium dioxide. However, other compounds of chromium (III) combined with oxygen, e.g., chromium (III) hydroxide, or their hydrates, can be employed as starting materials if desired.

The conversion of these starting materials to ferromagnetic chromium dioxide is customarily carried out at temperatures above 250° C., since conversion to ferromagnetic chromium dioxide at lower temperatures is very slow and usually incomplete. Although temperatures as high as 500° C. and above can be employed, such temperatures require the application of excessively high pressures and usually are to be avoided. Products of excellent magnetic properties are obtained when a maximum reaction temperature in the range of 300°-450° C. is employed.

The pressures employed in the processes of these prior art teachings usually range from about 50 atmospheres to 3000 atmospheres or more. Pressures of 50 to 800 atmospheres are preferred, since these pressures can be obtained more economically than higher pressures. The resulting chromium dioxide is then separated, dried and pulverized for its ultimate application.

For the preparation of small amounts of chromium dioxide on a laboratory scale, the reactions involved in these processes can be carried to completion in times as short as 10 minutes or less. On the other hand, when these processes are carried out on a commercial scale, it is customary to use pressure vessels or autoclaves that are circular in cross-section and usually cylindrical in overall form for the reason that this configuration is most suitable to withstand the mechanical stresses encountered at the operating pressures involved. To maximize productivity and operating economy of this inherently expensive equipment, it has been conventional to maximize the "charge," i.e., to fill the pressure vessel to the greatest possible extent with reactant materials in amounts that may reach several hundred pounds. Ordinarily, this is accomplished by loading the reactant materials in a reaction vessel having the form of a right cylinder. A plurality of such reaction vessels are then placed in stacked array in the pressure vessel and heated so that the desired hydrothermal reaction can take place. Because of the large mass of reactant material and the relatively inefficient heat transfer implicit in the loading arrangement, such a commercial-scale process may typically require a prolonged heating time of the order of 20 hours or more.

Once the reaction is complete, the pressure vessel is typically cooled and vented to allow excess steam and oxygen to escape. Following this, the reaction vessels are removed from the pressure vessel and dried, usually in an oven. This cooling, venting and drying typically takes on the order of 50 hours or more, in part because of the poor mass transfer of the water out of the reaction product and in part because of the poor heat transfer by which the product is permitted to cool and dry.

It is, therefore, an object of this invention to provide an improved process for the preparation of ferromagnetic chromium dioxide in which the processing times are reduced.

SUMMARY OF THE INVENTION

In accordance with this invention, a process for the preparation of ferromagnetic chromium dioxide which comprises heating a reaction mixture comprising one or more chromium oxides, wherein the chromium has an average valence other than +4, in the presence of water to a temperature greater than 250° C. under a pressure of at least 200 atmospheres and then cooling and drying the resulting ferromagnetic chromium dioxide is improved by heating the reaction mixture to form a rigid mass of chromium dioxide in an annulus closed at one end and defined by inner and outer walls having thermal coefficients of expansion different from that of the rigid mass of chromium dioxide, and cooling both the chromium dioxide and the annulus to cause one of said walls to separate partially from contact with the rigid mass of chromium dioxide, thus forming a ring-like escape path for water vapor, thereby improving the mass transfer and heat transfer characteristics of the process.

In a particularly preferred embodiment of the invention, thermal coefficient is positive, the annulus is circular, and is provided with a lid having a depending lip portion adapted to fit within the inner wall, thereby to direct condensing moisture away from the chromium dioxide.

BRIEF DESCRIPTION OF THE DRAWINGS

Further advantages and features of this invention will become apparent upon consideration of the following description in which.

DETAILED DESCRIPTION OF THE PREFERRED EMBODIMENTS

Figure 1:
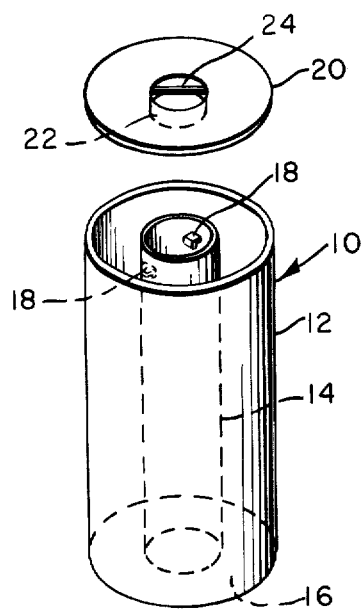
FIG. 1 is a pictorial representation, partly exploded, of a reaction vessel that may be used in the hydrothermal process of this invention.
Figure 2:
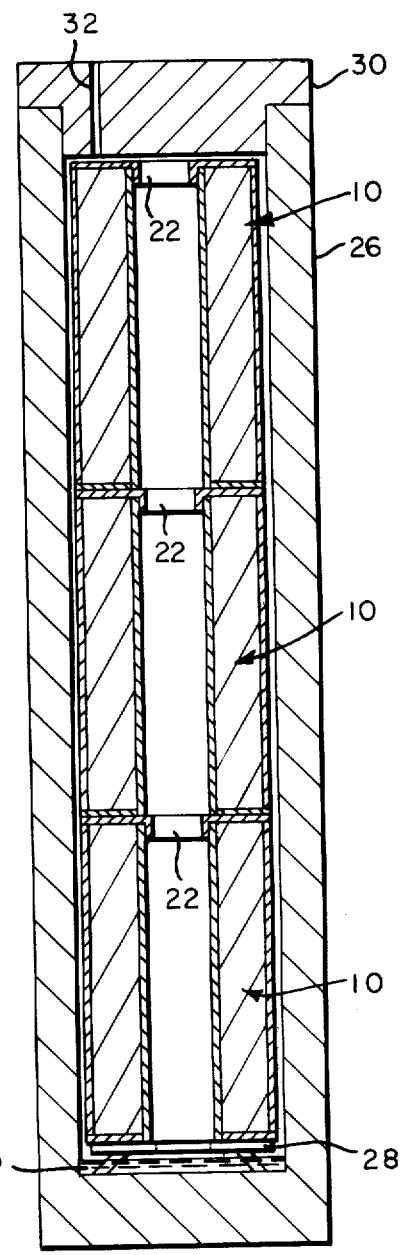
FIG. 2 is a cross-sectional view of a plurality of the reaction vessels disposed vertically within a pressure vessel in which the process of this invention may take place.

There are various processes for the preparation of chromium dioxide which are carried out at elevated temperature under superatmospheric pressure in an aqueous medium. Among these processes are those described in U.s. Pat. Nos. 2,885,365; 2,923,683; 2,923,684; 2,923,685; 2,956,955; 3,034,988; 3,117,093; and 3,278,263. The processes of these patents employ as starting materials chromium oxides wherein the average valence of the chromium is other than +4, and involve the conversion of these oxides to chromium (IV) oxide by heating them alone, as mixtures with one another, or with other materials. Some of these processes may also include the use of various modifying agents such as antimony, iron, ruthenium, and tin to influence in a desired manner the properties of the chromium dioxide ($CrO_2$) produced.

In most of these processes, water may be, and usually preferably is, present as a reaction medium in an amount of at least 1% by weight of the starting chromium oxide compounds or of the conversion products thereof. Usually, somewhat larger amounts, in the range of 5-300% by weight, of water are employed. Upon completion of the reaction of any of these processes, recovery of a dry $CrO_2$ product from such relatively large quantities of water requires additional steps by which the water vapor is vented to dry the product insofar as practically possible. During this period, the reaction vessel is cooled, following which the reaction vessel is placed in a drying oven until the product is dried sufficiently for further processing by pulverizing, etc.

In a typical process, as taught, for example, by the Cox patent previously mentioned, chromium dioxide ($CrO_2$) is made by reacting a paste comprising $CrO_3/Cr_2O_3/H_2O$ in an autoclave at 350° C. and 500 atmospheres pressure. Paste may be made, using the various formulations taught by the prior art, in separate mixing vessels or in the reaction vessels themselves by adding $CrO_3$ and $H_2O$ and forming a slurry of $CrO_3$ flake in a saturated aqueous solution of $CrO_3$. Small amounts of $Sb_2O_3$ and $Fe_2O_3$ are added. Then $Cr_2O_3$ is added. A black viscous mass (paste), the consistency of honey, forms in an exothermic reaction. The paste is transferred to (if prepared elsewhere) and stored in the reaction vessel until time to place the reaction vessel in the pressure vessel for hydrothermal conversion of the paste to $CrO_2$. The paste becomes more viscous as it ages, becoming tar-like in about an hour.

The paste is contained in right cylindrical reaction vessels which typically are stacked 3 or 4 deep in a vertical cylindrical pressure vessel. Loose-fitting lids on the reaction vessels keep most of the water vapor in and exclude external condensate. The stack of reaction vessels, placed on a stool above the bottom of the pressure vessel, fills nearly all of the volume of the pressure vessel so that free space is minimized. To prevent drying of the paste, sufficient additional water is poured into the bottom of the pressure vessel to provide steam to saturate the free space during processing. The free space in the reactor is kept small, so that water need is minimized and the evolved oxygen is more than enough to bring the reactor vessels to the desired process pressures when heated. Excess oxygen is vented through an automatic pressure-relief valve set to open at the desired pressure. The reaction is judged to be complete when the evolution of oxygen stops. Then the reactor vessels and their contents are cooled. Finally, at or near a lower temperature, typically 100° C., the excess oxygen is vented off, the pressure vessel is opened, and the cans of $CrO_2$ are removed, to be dried and finished to salable $CrO_2$ powder by suitable known aftertreatments.

In accordance with the present invention, any process for the preparation of ferromagnetic chromium dioxide, which process is carried out at elevated temperatures and superatmospheric pressures in the presence of water, is modified by the placement of the reaction mixture in an annulus 10 (also termed a reaction vessel or container) such as that depicted in FIG. 1. As is shown in FIG. 1, the annulus is formed by an outer wall 12 and an inner core wall 14 coaxially aligned and closed at the bottom by a bottom wall 16. The outer and inner walls and bottom wall 12, 14 and 16, respectively, may be formed of any suitable material having a thermal coefficient of expansion different from that of the rigid mass of chromium dioxide. Materials such as a mild steel or a stainless steel, having a positive temperature coefficient, are preferred and are described in this preferred embodiment. Suitable lifting lugs 18 may be placed on the inside of the inner wall 14 at the upper portion thereof to facilitate lifting the annulus 10 as will be described hereinafter.

A lid 20 loosely sits on top of the annulus 10 to close the same. It is provided on the underside with a depending lip portion 22 which is sized to fit inside the inner core wall 14. Finally, the inner surface of the lid 20 may be provided with a handle 24 so that it too may be lifted. The handle 24 is flush with the lid or slightly recessed to permit stacking of the reaction vessels.

Further in accordance with the improved process, several annuluses 10 are filled with a reaction mixture (which typically may be prepared in a separate vessel, since it is sometimes difficult to mix properly in an annular can), their respective lids placed thereon, and placed within a pressure vessel 26 in stacked array. They may be stacked upon a stool 28 having a ring-like or core-like surface so that the several annuluses 10 do not rest in the water 29 which normally occupies the lower portion of the pressure vessel. The pressure vessel has a top 30 which provides a pressure seal. Suitable heating elements (not shown) are provided to permit the process temperatures to be achieved. The pressure vessel is also provided at the top portion with a pressure controlled vent 32. The use of the lids may be omitted but is preferred.

In a typical case, each container or annulus 10 may have a 19-inch outside diameter and a height of 33 inches and be formed of ¼-inch mild steel; the core or inner wall 14 may be formed of 6-inch IPS (Iron Pipe Size) Schedule 40 iron pipe.

When the process of this invention is followed utilizing the annulus 10, there is a net gain in productivity even though the reaction vessel is decreased in volume. This net gain occurs for several reasons. Firstly, the annular construction of the reaction vessel accelerates heat transfer in both the heating and the cooling portions of the process cycle. The accelerated heat transfer is believed to result from several factors, the first being that there are two major surfaces, the outer wall 12 and the inner wall 14, through which heat can be transferred to and from the reaction mixture. In addition, the heat-transfer mechanism appears to depend at least partially on an evaporation/condensation cycling of the water 29 contained in the reaction vessel, so that, unpredictably but favorably, the heat-transfer rates through the outer and inner walls are essentially equal.

Figure 3:
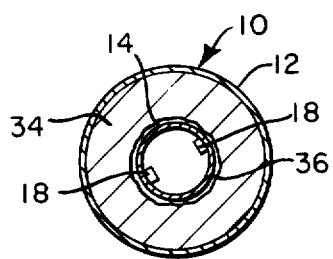
FIG. 3 is a cross-sectional view of the reaction vessel of FIG. 1 depicting the ring-like escape void which facilitates heat transfer and mass transfer during cooling in accordance with this invention.
Figure 4:
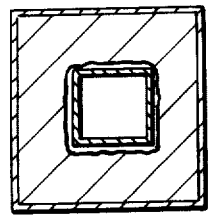
FIG. 4 is a cross-sectional view of an alternative reaction vessel having a rectangular cross-section that may be used in the process of this invention.

Secondly, the net gain in productivity occurs, surprisingly, because of improved mass transfer. This improved mass transfer results in shortened cooling and drying times and comes about, as may be seen most clearly with reference to FIG. 3, in that, when the chromium dioxide is formed, it changes from a paste of tar-like consistency to a rigid, porous mass 34 within the annulus 10 at or near the maximum temperatures achieved in the processs cycle. As cooling subsequently takes place, a ring-like void 36 forms between the rigid mass 34 and the inner wall 14, providing a unique escape path for the steam. Such steam is the primary escaping product that must be removed during the cooling and drying portions of the process cycle. In fact, it is most desirable that as much water vapor (steam) be removed as possible during cooling and venting so that the product need be subjected to only a minimum of oven drying.

While the mechanism by which the ring-like void 36 is formed is not completely understood, it is believed that the following is at least partly responsible. When the outer wall 12 and inner wall 14 are made of metals having positive thermal coefficients of expansion greater than that of the rigid porous mass 34, they tend to expand during the heating portion of the cycle thereby increasing the diameter of both the inner and outer walls. The initial paste-like reaction mixture readily conforms to such change. Then, during the cooling portion of the cycle, the outer and inner walls 12 and 14 contract more than does the now rigid porous mass 34, permitting the inner wall 14 to pull away from and withdraw from the rigid mass 34. Since the void 36 which is formed is greater than that attributable to the different expansion/contraction rates alone, there are other mechanisms at work which are not understood. Possibly the steam, escaping through the initially formed void cuts or enlarges the void to further improve the mass transfer. Whatever the explanation, the fact is that mass transfer is significantly and surprisingly enhanced.

Due to the improved heat transfer and improved mass transfer permitted by the process of this invention, the productivity of the reactors is considerably increased. Because of the decreased cycle time, the loss of volume due to the annular can usage is more than compensated, i.e., there is a net gain in productivity even though the individual charge per can is smaller. Thus, contrary to the practice of the prior art that held a maximum amount per charge to be essential to maximum productivity, it has now been found surprisingly and innovatively according to the present invention that maximum productivity results when each reaction vessel is only partly full, that is, when part of the volume is given over to the hollow core or chimney in the center of the annulus.

According to the improved process of this invention, productivity increases of 50% or more are obtainable. In a typical example, the heating period is decreased from 22 hours to 12 hours, the cool/vent period is decreased from 9 hours to 7¼ hours, and finally, shorter drying times are required whether an oven or controlled high-temperature venting is used. An additional advantage resulting from this invention is improved product homogeneity, because of more uniform time-temperature histories permitted by the more efficient heat transfer and mass transfer. As a final step in the process, the material may be removed from the annulus by a blade moving in a circular path to lathe out the material in a known manner.

An additional advantage of the improved process of the invention relates to ease of handling the reaction vessels. Before the hydrothermal reaction, paste fills the reaction vessels to within 3-4 inches from the top of each vessel. Lifting lugs, welded to the interior surface of the prior art reaction vessels at the top edge, are thus normally readily accessible to a hoisting yoke for transfer to a pressure vessel. However, during the hydrothermal conversion reaction, the reaction mass expands to fill the reaction vessel, sometimes even rising out of the reaction vessel, and becomes rigid and frangible. It is then difficult and time-consuming to locate the lifting lugs and to penetrate the rigid, frangible "clinker" so that the hooks of the hoisting yoke can be attached to the lugs to remove the reaction vessels from the pressure vessel. This difficulty is completely eliminated by the use of annular reaction vessels according to this invention. The placement of lifting lugs 18 on the upper inner surface of inner wall 14 completely removes them from any possibility of being obscured by expanded rigid mass 34 and makes them readily accessible for easy attachment of the hooks of the hoisting yoke. This is an important advantage that significantly reduces expensive time and labor in unloading the pressure vessel.

Using the process of this invention, the cool/vent cycle time can be reduced to an extent limited primarily by the heat transfer through the reactor wall. Hence, depending on the amount of water permitted in the final product the cycle time is longer or shorter as required to reach the degree of "dryness" desired. The process of this invention permits the pressure vessel to be vented while hot if desired with many of the same advantageous reductions in total process time while obtaining a relatively dry product often requiring no oven drying. While they have not been tried, it is believed that reaction vessels could also be constructed using materials having negative temperature coefficients of expansion. Such materials would initially contract when heated and expand when cool forming the "void" immediately inside the outside walls 12, thereby similarly improving mass transfer.

We claim:

1. In a process for the preparation of ferromagnetic chromium dioxide which comprises heating a reaction mixture comprising one or more chromium oxides wherein the chromium has an average valence other than +4 in the presence of water to a temperature greater than 250° C. and under a pressure of at least 200 atmospheres, and cooling and drying the resulting ferromagnetic chromium dioxide, the improvement comprising:

heating said reaction mixture to form a rigid mass of chromium dioxide, in an annulus closed at one end and defined by inner and outer walls coaxially aligned each having a thermal coefficient of expansion different from that of said rigid mass of chromium dioxide, said inner wall defining a hollow column open at both ends, and cooling both said chromium dioxide and said annulus to cause one of said walls to separate partially from contact with said rigid mass of chromium dioxide forming a ring-like escape path for water vapor.

2. In the process set forth in claim 1 the improvement wherein said annulus is circular.

3. In the process set forth in claim 1 wherein on top of said annulus is a lid having a depending lip portion adapted to fit within said inner wall.

4. In the process set forth in claim 3 stacking a plurality of annuluses end-on-end so that said inner walls define a continuous chimney during heating and cooling.

5. In the process set forth in claim 4 wherein each said annulus is circular.

6. In the process set forth in claim 5 wherein tabs are provided on the inner surface of said inner wall, thereby to permit the lifting of each said annulus without disturbing said rigid masses.

7. In the process set forth in claim 6 wherein said thermal coefficients of said inner and outer walls are positive.

8. In the process set forth in claim 1 wherein said thermal coefficients of said inner and outer walls are positive.

* * * * *